US012227393B2

(12) United States Patent
Müer

(10) Patent No.: US 12,227,393 B2
(45) Date of Patent: Feb. 18, 2025

(54) ATTACHMENT POINT

(71) Applicant: J. D. Theile GMBH & CO. KG, Schwerte (DE)

(72) Inventor: Bernd Müer, Schwerte (DE)

(73) Assignee: J. D. Theile GmbH &Co. KG, Schwerte (DE)

(*) Notice: Subject to any disclaimer, the term of this patent is extended or adjusted under 35 U.S.C. 154(b) by 236 days.

(21) Appl. No.: 17/923,746

(22) PCT Filed: May 12, 2021

(86) PCT No.: PCT/EP2021/062661
§ 371 (c)(1),
(2) Date: Nov. 7, 2022

(87) PCT Pub. No.: WO2021/233757
PCT Pub. Date: Nov. 25, 2021

(65) Prior Publication Data
US 2023/0202805 A1 Jun. 29, 2023

(30) Foreign Application Priority Data
May 20, 2020 (DE) .................... 20 2020 102 887.1

(51) Int. Cl.
*B66C 1/66* (2006.01)
*F16G 15/08* (2006.01)

(52) U.S. Cl.
CPC ............ *B66C 1/66* (2013.01); *F16G 15/08* (2013.01)

(58) Field of Classification Search
CPC .. B66C 1/66; B66C 1/36; B66C 13/06; F16G 15/08
(Continued)

(56) References Cited

U.S. PATENT DOCUMENTS 3,795,951 A * 3/1974 Ratcliff .................... B66C 1/34
59/93
6,418,871 B1 7/2002 Simon
(Continued)

FOREIGN PATENT DOCUMENTS

CN 104141697 A 11/2014
CN 105190093 A 12/2015
(Continued)

OTHER PUBLICATIONS

International Search Report dated Sep. 22, 2021 in parent international application PCT/EP2021/062661.
(Continued)

*Primary Examiner* — Paul T Chin
(74) *Attorney, Agent, or Firm* — Polson Intellectual Property Law P.C.; Margaret Polson; Christopher Sylvain

(57) ABSTRACT

An anchor point comprising a connecting means for connecting the anchor point to an object to be fixed and/or handled, with an eyelet bend connected to a base body and a connecting eyelet hooked into the eyelet bend for connecting an anchoring or lashing means. The connecting eyelet has a smaller radius in its bend hooked into the eyelet bend than in its other bend, and carries two dividing elements opposite one another with respect to their longitudinal axis projecting into the interior space enclosed by the connecting eyelet. The connecting eyelet carries a projecting movement limiting stop with respect to its central fiber opposite the dividing elements, in each case on the outside for limiting the depth of immersion of the connecting eyelet in the eyelet bend together with the dividing elements which project on the inside and are likewise designed as movement limiting stops. Due to the movement limiting stops, the maximum diameter of the section of the connecting eye carrying the movement limiting stops is greater than the clear width of the eyelet bend, wherein the contour forming
(Continued)

the movement limiting stops is shaped so that there is essentially only line contact between the movement limiting stops and the eyelet bend in the stop arrangement.

11 Claims, 2 Drawing Sheets

(58) Field of Classification Search
USPC .............................................. 294/82.17, 215
See application file for complete search history.

(56) References Cited

U.S. PATENT DOCUMENTS

| | | | | |
|---|---|---|---|---|
| 8,100,449 | B2* | 1/2012 | Wray | B66C 1/36 |
| | | | | 294/82.23 |
| 8,205,922 | B1* | 6/2012 | Ohman, Jr. | F16G 15/06 |
| | | | | 294/82.11 |
| 8,602,468 | B2* | 12/2013 | Kutsen | B66C 1/125 |
| | | | | 294/82.17 |
| 10,822,204 | B2* | 11/2020 | Maassen | B66C 1/34 |
| 10,858,222 | B1* | 12/2020 | Laarman | B66C 1/36 |
| 2021/0114844 | A1 | 4/2021 | Foitzik | |

FOREIGN PATENT DOCUMENTS

| | | |
|---|---|---|
| CN | 109477508 A | 3/2019 |
| DE | 202005019359 U1 | 3/2006 |
| DE | 102006052986 A1 | 6/2007 |
| DE | 202016004077 U1 | 10/2016 |
| JP | 2007162868 A | 6/2007 |

OTHER PUBLICATIONS

Written Opinion of the International Searching Authority dated Sep. 22, 2021 in parent international application PCT/EP2021/062661.
Examination Report dated Nov. 29, 2024 in related Taiwan application No. 110117896.

* cited by examiner

ATTACHMENT POINT

BACKGROUND

The present disclosure relates to an anchor point, also referred to as an attachment or connection point herein, for fixing to an object to be fixed and/or handled, comprising a connecting means for connecting the anchor point to an object to be fixed and/or handled, with an eyelet bend connected to a base body and a connecting eyelet hooked into the eyelet bend for connecting an anchoring or lashing means, which connecting eyelet has a smaller radius in its bend hooked into the eyelet bend than in its other bend, and which connecting eyelet carries two dividing elements opposite one another with respect to their longitudinal axis and projecting into the interior space enclosed by the connecting eyelet.

Such anchor points are typically used for lifting objects. The anchor point is connected to the object to be lifted or fixed by means of their connecting means, typically in the form of a screw bolt. In many cases, such an anchor point is designed so that when a hoist hooked into the connecting eyelet is applied, the connecting eyelet aligns itself according to the direction of pull acting on it. In such a connection point, the base body carrying the eyelet bend is designed as an upper part which can be rotated relative to a lower part carrying the one or more connection means. The same properties are also desired for an anchor point when it is used for lashing an object, in principle also when the anchor point is not designed as an anchor swivel with an upper part that can be rotated relative to the lower part.

Depending on the particular circumstances, the tensile loads applied to such an anchor point can also act from transverse directions. In order to counteract latching of the connecting eyelet within the eyelet bend of the base body, it is proposed in DE 10 2006 052 986 B4 to hook the bend of the connecting eyelet, which is designed with the smaller radius, into the eyelet bend. Due to the smaller radius of this bend, a two-point support of the bend within the eyelet bend can be avoided as far as possible, so that the connecting eyelet can hinge better with the eyelet bend. In addition, in this previously known connection point, it is provided that a dividing element projects from each leg connecting the bends into the interior space enclosed by the connecting eyelet. The dividing elements divide the interior space into a region in which the eyelet bend is arranged and a further region in which an anchoring or lashing means can be hooked. The clear width between the dividing elements is dimensioned so that the eyelet bend does not fit through. This ensures that the bend with the smaller radius remains in its position hinged to the eyelet bend of the base body. The dividing elements limit the immersion depth of the connecting eyelet in the eyelet bend.

Even though this previously known anchor point has already achieved a significant improvement over older anchor points in terms of transverse load-bearing capacity, it would be desirable for the connecting eyelet to be free of anchoring relative to the eyelet bend even in the case of unfavorable angular positions of the connecting eyelet relative to the eyelet bend.

SUMMARY

Based on the state of the art discussed above, the present disclosure proposes such an anchor point which is improved with respect to its freedom from anchorage.

This aspect is provided by a generic anchor point of the type mentioned at the outset, in which the connecting eyelet, with its central fiber opposite the dividing elements, carries on the outside in each case a projecting movement limiting stop for limiting the depth of insertion of the connecting eyelet into the eyelet bend, together with the dividing elements which project on the inside and are likewise designed as movement limiting stops, by which movement limiting stops the maximum diameter of the section of the connecting eyelet bearing the movement limiting stops is greater than the clear width of the eyelet bend, wherein the contour forming the movement limiting stops is shaped so that there is essentially only line contact between the movement limiting stops and the eyelet bend in the stop arrangement.

In addition to the internally projecting dividing elements of the connecting eyelet, this connection point also has externally projecting movement limiting stops. These are located opposite the dividing elements with respect to the central fiber of the connecting eyelet and are arranged in such a way that, in cooperation with the dividing elements, the depth of insertion of the connecting eyelet into the eyelet bend is limited. The dividing elements also act as movement limiting stops. Each pair of movement limiting stops having a movement limiting stop projecting into the interior space and a movement limiting stop projecting externally is arranged with respect to the connecting eyelet so that the connecting eyelet can hinge unhindered with respect to the eyelet bends hooked in its bend with the smaller radius. The movement limiting stops are thus arranged to limit the depth of immersion of the connecting eyelet such that no straight leg portion engages the eyelet bend, at least not in such a length or arrangement that a stable two-point support could be established between the connecting eyelet and the eyelet bend. Typically, the movement limiting stop pairs are located in the end section of the legs at their end facing the bend with the smaller radius.

In addition, this connection point is characterized by the fact that, in the anchor position, there is essentially only line contact between one or both of the movement limiting stops of a movement limiting stop pair and the inner lateral surface of the eyelet bend. Eyelet bends of such anchor points are rounded on the inside to provide the desired hingeability. Thus, the plane with the smallest diameter of the eyelet opening of the eyelet bend is located in the central longitudinal plane of the same. The measure described above ensures that the two parts that can move against each other—the connecting eyelet and the eyelet bend—cannot latch together as a result of a two-dimensional frictional connection. This, in combination with the above-described measure that only curved surfaces are in contact with each other in the anchor case, is responsible for the fact that the connecting eyelet can be easily freed from any transverse position even when only a small tensile force is applied, so that the connecting eyelet is brought into contact with the eyelet bend with the inside of its bend hinging to the eyelet bend when an even small tensile force is applied.

According to one embodiment, the inner lateral surface of the bend of the connecting eyelet hooked into the eyelet bend is rounded up to the contour of the movement limiting stop, so that the inner side of this bend merges into the contour of the movement limiting stop while continuing the curvature.

The design of such an anchor point is of particular advantage if the base body with the eyelet bend forms the upper part of an anchor swivel which is rotatable relative to a lower part carrying the connection means. Then not only the inclination of the connecting eyelet with respect to the eyelet bend is oriented in the direction of the acting tensile force, but also in the circumferential direction. This improves the safety of this anchor point compared to previously known ones, especially when transverse forces are applied. The rotatability of the upper part relative to the lower part can be provided by suitable bearings, such as a plain bearing or also with the interposition of one or more rows of rolling elements.

In a weight-optimized embodiment, the cross-sectional area in the respective sections of the connecting eyelet in which a movement limiting stop pair is arranged is not, at least not appreciably, larger than in the sections of the connecting eyelet adjacent thereto. This means that in the region of the respective movement limiting stop pairs in the transverse direction to the extension thereof, the connecting eyelet has a reduced material thickness. In a preferred embodiment, the internally projecting dividing elements as movement limiting stops and the externally projecting movement limiting stops are produced from the connection eyelet, which typically has a circular cross-sectional surface, by a single forming operation carried out transversely to the plane of the connection eye. Then the connecting eyelet also has the same cross-sectional area in these sections as in the adjacent, non-formed sections. Preferably, the movement limiting stops of a movement limiting connection pair merge over the width of the sections of the connecting eyelet supporting these into those of the movement limiting stops projecting on the outside. The cross-sectional geometry can be the same for such a transition from the inside movement limiting stop to the outside movement limiting stop over the cross-section of this section in the connecting member. As a result, the connecting eyelet is not weakened, since the connecting member is stressed only in the direction of its longitudinal extension by the applied tensile force, and not in a direction transverse to the plane of the connecting eyelet, and due to the measures described above, the connecting eyelet, together with a rotatable upper part, is readily aligned in tensile force.

According to one embodiment, the legs connecting the bends of the connecting eyelet are straight. In another embodiment, the legs are S-shaped in at least one section.

BRIEF DESCRIPTION OF THE DRAWINGS

The present disclosure is described below with reference to the accompanying figures by way of an example embodiment, wherein.

DETAILED DESCRIPTION

Figures 1, 2:
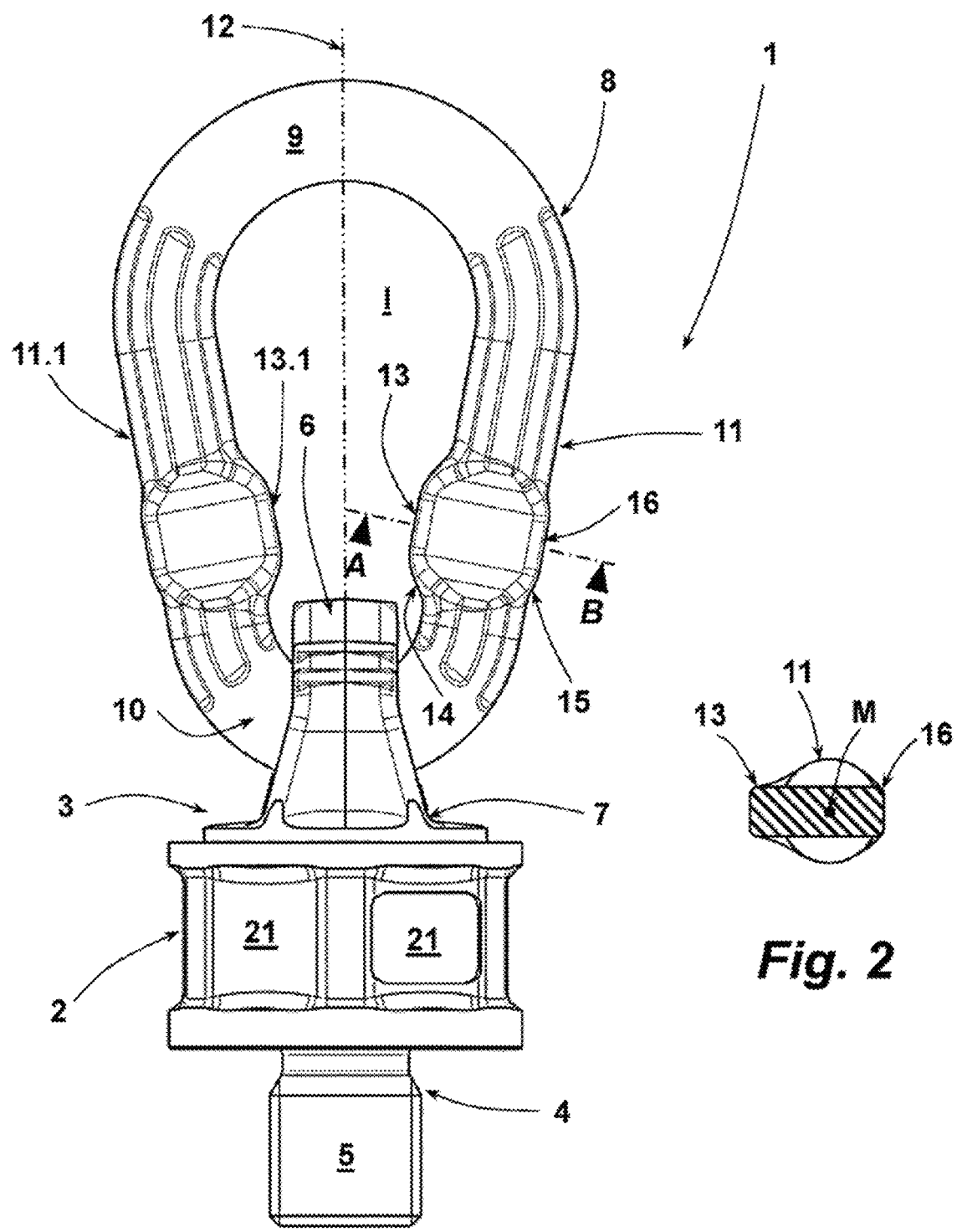
FIG. 1 shows a side view of a connection point according to the present disclosure.
FIG. 2 shows a cross-sectional view through the connecting eyelet of the connection point taken along line A-B of FIG. 1.

With reference to FIG. 1, an anchor or connection point 1 is used to connect to an object so that it can be handled, e.g. lifted, lashed or the like, depending on the application. The anchor point 1 has a lower part 2 and an upper part 3. The upper part 3 is rotatably mounted relative to the lower part 2. A screw bolt 4 is connected to the lower part, the threaded section 5 of which is used to connect the anchor point 1 to an object to be handled by screwing it into an appropriately prepared internally threaded hole of the object. The upper part 3 carries an eyelet bend 6, which, together with a part of the base body 7 of the upper part 3, forms an eyelet. A connecting eyelet 8 is hooked into the eyelet bend 6. The purpose of the connecting eyelet 8 is to connect a lifting or lashing means, such as a crane hook, a rope, a belt or the like. The connecting eyelet 8 is asymmetrical with respect to its elongation and has a first bend 9 with a larger radius and a second bend 10 with a smaller radius. The connecting eyelet 8 is hooked into the eyelet bend 6 of the upper part 3 with its bend 10 of smaller radius and can hinge on the latter. The legs 11, 11.1 connecting the two bends 9, 10 are straight and inclined towards each other in the illustrated design example, whereby the interior space I enclosed by the connecting eyelet 8 tapers in the direction of the bend 10.

The connecting eyelet 8 is designed to be mirror-symmetrical to the central longitudinal plane marked with the reference sign 12 in FIG. 1. The center longitudinal plane 12 is indicated in this figure by its track. For this reason, the two legs 11, 11.1 are of identical design. The leg 11 is described in more detail below. The same statements apply equally to leg 11.1.

The connecting eyelet 8 basically has a circular cross-sectional geometry in its bends 9, 10 and its legs 11, 11.1. In the area of its end section facing the bend 10 with the smaller radius, the leg 11 carries a dividing element 13 projecting inwards into the interior space I, the contour of which facing the bend 10 forms a movement limiting stop 14. Together with the dividing element 13.1 of the leg 11.1, the dividing element 13 divides the interior space I of the connecting eyelet 8 into the area in which the eyelet bend 6 is hinged and into the area which is larger in terms of its clear width and in which a crane hook or other lashing means engages or is to be connected. A further movement limiting stop 15 is provided on the outside opposite the dividing element 13 with respect to the virtual central long fiber M of the leg 11, which is shown schematically in FIG. 2, by means of a correspondingly shaped projection 16 (see also FIG. 2). In the illustrated embodiment, the dividing element 13 and the projection 16 are provided by a flattening of the leg 11 on both sides, as can be seen in the sectional view of FIG. 2. This flattening of the leg 11 is symmetrical to the center plane in the plane of the connecting eyelet 8. Due to the flattening, the cross-sectional area is not reduced compared to the sections of leg 11 that are round in cross-section. In the area of the flattening forming the two projecting structures 13, 16, the cross-sectional area corresponds to the cross-sectional area in the sections of the leg 11, which are round in cross-section.

The contours of the dividing element 13 as well as of the projection 16, which form the movement limiting stops 14, 15, are rounded, and in the illustrated example embodiment without intervening straight sections, in any case without any such sections that would have played a role in the described context. The radius of the concave section of the movement limiting stop 14 merges into the radius of the bend 10.

Both movement limiting stops 14, 15 have an elongated S-shaped contour towards the bend 10. The amount by which the dividing element 13 projects into the interior space I is several times greater in the illustrated embodiment than the amount by which the projection 16 projects from the lateral surface of the adjacent cylindrical lateral surface of the leg 11.

Figure 3:
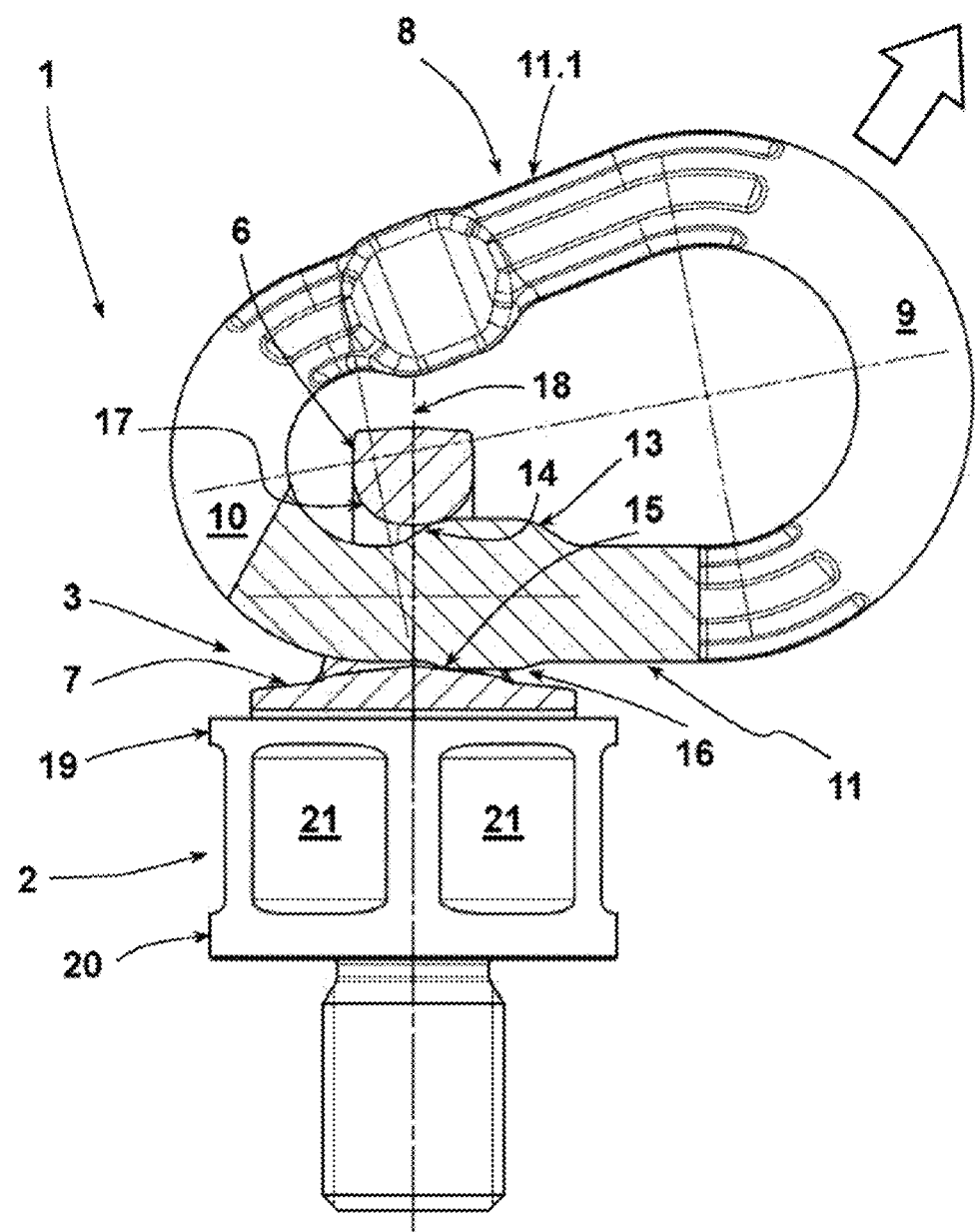
FIG. 3 shows a partially cut side view of the connection point of FIG. 1 with its connecting eyelet misaligned with respect to the orientation in FIG. 1.

FIG. 3 shows a sectional view of the anchor point 1 in the area of its eyelet bend 6. From this illustration, it can be seen that the eyelet bend 6 is rounded on its side 17 facing the eyelet opening. The radius is adapted to the diameter of the bend 10 of the connecting eyelet 8 so that both elements can hinge together as intended. In the figures, the eyelet opening of the eyelet bend 6 is limited on the underside by the upper end of the base body 7. Also on this side of the eyelet opening, the clear width of the eyelet opening is reduced towards the central longitudinal plane 18 of the eyelet bend 6.

FIG. 3 shows the connecting eyelet 8 hooked with its bend 10 in the eyelet bend 6 in a position in which it is swiveled by the maximum amount of swiveling permitted at the anchor point 1 compared to its position shown in FIG. 1. This amounts to approximately 80°. The pivoting is limited by the permitted maximum depth of immersion of the leg 11 in the eyelet opening of the eyelet bend 6 by the two movement limiting stops 14, 15. In the anchor position shown in FIG. 3, the movement limiting stop 14 contacts the curved inner lateral surface 17 of the upper part of the eyelet bend 6 with its convexly shaped section, while the movement limiting stop 15 also stops with its convex outer contour against the boundary of the eyelet opening through the upper side of the base body 7. This anchor contact is circumferential. Due to the contact of the curved contours, the immersion depth of the leg 11 in the eyelet opening of the eyelet bend 6 is limited by a line contact.

If a tensile force acts on the connecting eyelet 8 of the connection point 1, as shown for example in FIG. 3 by the block arrow, the eyelet 8 is pulled out without further ado from its position shown in FIG. 3, so that the inside of the bend 10 comes into contact with the eyelet bend 6 and the two elements can hinge together as intended. Even with a tensile force acting on the connecting eyelet 8, which acts on the bend 9 perpendicular to the drawing plane, the connecting eyelet 8 aligns itself in the direction of the applied tensile force without further ado. When such a force is applied, the upper part 3 is rotated relative to the lower part 2 until the bend 9 points in the direction of the tensile force. At the same time, the connecting eyelet 8 is pulled into its intended hinge position with the eyelet bend 6.

The measures described effectively prevent latching of the connecting eyelet 8 in or on the eyelet bend 6 of the upper part 3.

In some applications, it is necessary for the anchor point to be loaded with a tensile force acting transversely to the longitudinal axis of the screw bolt for the purpose of handling it. This is easily possible with the anchor point 1 without having to fear that in this position the connecting eyelet 8 will seize in relation to the eyelet bend 6.

In addition, the connection point 1 shown in the figures is particularly resilient to applied transverse forces without the risk of the upper part 3 being torn out of the lower part 2. This is achieved by the fact that the upper end of the lower part 2 carries a circumferential flange 19 projecting in the radial direction. This has a circular outer contour geometry. The diameter of the flange 19 corresponds to the diameter of the lower contact flange 20 in the illustrated example embodiment, which is clamped with its lower side against the surface of the object to be handled. This flange 19 acts as a reinforcing annular body with respect to the upper end of the lower part 2. This ensures that higher transverse forces can be applied to the upper part without the risk of the upper part being torn out of the receptacle of the lower part or of the receptacle of the upper part tearing open laterally in the lower part.

For fastening the lower part 2 to an object to be handled, its radially outer lateral surface has end flats 21. In the illustrated example embodiment, these are arranged in the manner of a hexagon. The flange 19 overhangs the end flats 21 in the radial direction, so that this measure not only provides an effective breakaway protection for the upper part 3, but at the same time provides an effective slip-off protection for a tool, typically a jaw fastener, with which the lower part 2 of the anchor point 1 is clamped to an object to be handled.

The invention is described with reference to an example embodiment. Without departing the scope of the claims, there are numerous further possibilities for a person skilled in the art to implement the same without these needing to be explained or shown in detail in the context of this disclosure.

LIST OF REFERENCE NUMBERS

1 Anchor point
2 Lower part
3 Upper part
4 Screw bolt
5 Threaded section
6 Eyelet bend
7 Base body
8 Connecting eyelet
9 Bends
10 Bend
11, 11.1 Leg
12 Central longitudinal plane
13, 13.1 Dividing element
14 Movement limiting stop
15 Movement limiting stop
16 Projection
17 Surface
18 Central longitudinal plane
19 Flange
20 Contact flange
21 End flat
I Interior space
M Central fiber

The invention claimed is:

1. An anchor point, comprising:
a connecting means for connecting the anchor point to an object to be fixed and/or handled,
an eyelet bend connected to a base body, and
a connecting eyelet hooked in the eyelet bend for connecting an anchoring or lashing means, wherein the connecting eyelet has two bends, and the connecting eyelet has a smaller radius in its bend hooked into the eyelet bend than in its other bend,
wherein the connecting eyelet carries two dividing elements which are opposite one another with respect to their longitudinal axis and project into an interior space enclosed by the connecting eyelet,
wherein the connecting eyelet carries, opposite the dividing elements with respect to a central fiber of the connecting eyelet, in each case on an outside thereof a projecting movement limiting stop for limiting the depth of immersion of the connecting eyelet in the eyelet bend together with the dividing elements which project on the inside and are likewise designed as movement limiting stops,
wherein, due to the movement limiting stops, a maximum diameter of the section of the connecting eye carrying the movement limiting stops is greater than a clear width of the eyelet bend, and
wherein a contour forming the movement limiting stops is shaped such that there is essentially only line contact between the movement limiting stops and the eyelet bend in a stop arrangement.

2. The anchor point of claim 1, wherein at least one of the contours of the eyelet bend and the movement limiting stop of the connecting eyelet contacting each other in the stop arrangement is designed rounded.

3. The anchor point of claim 1, wherein the movement limiting stop projecting into the interior space of the connecting eyelet projects further from the respective section of the connecting eyelet than the movement limiting stop on the outside.

4. The anchor point of claim 1, wherein the two bends of the connecting eyelet are connected by legs of the connecting eyelet, and the movement limiting stops are arranged in an end section of the legs facing the bend with the smaller radius.

5. The anchor point of claim 1, wherein, in a region of the movement limiting stops, a cross-sectional area of the respective section of the connecting eyelet is not larger than in sections of the connecting eyelet adjacent thereto.

6. The anchor point of claim 1, wherein two movement limiting stops belonging to one another in one leg of the connecting eyelet merge into one another.

7. The anchor point of claim 6, wherein the connecting eyelet section has a uniform cross-sectional surface in the region of the movement limiting stops lying opposite one another on the inside or outside.

8. The anchor point of claim 1, wherein legs of the connecting eyelet connecting the bends are designed as straight legs.

9. The anchor point of claim 1, wherein legs of the connecting eyelet connecting the bends are S-shaped.

10. The anchor point of claim 1, wherein the base body carrying the eyelet bend forms an upper part of the anchor point or is part of such an upper part, and wherein the upper part is rotatable relative to a lower part which carries the connecting means.

11. The anchor point of claim 1, wherein the connecting means of the anchor point is designed as a screw bolt.

* * * * *